United States Patent Office 2,912,438
Patented Nov. 10, 1959

2,912,438

NEW ACETANILIDES DERIVATIVES AND THE MANUFACTURE THEREOF

Peter Oxley, Norman William Bristow, Gerald Woolfe, and George Alfred Harrison Williams, Nottingham, England, assignors to Boots Pure Drug Company Limited, Nottingham, England, a British company No Drawing. Application July 19, 1955
Serial No. 523,110

Claims priority, application Great Britain July 22, 1954

8 Claims. (Cl. 260—340.5)

The invention relates to new derivatives of acetanilide which have been found to possess valuable properties as amoebicides.

The invention consists in the compounds of the general formula:

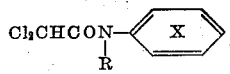
I in which R represents an alkyl or aralkyl radical and in which the phenyl radical X is substituted by one or more groups which may be the same or different and which are selected from hydroxy, alkoxy, aralkoxy, aryloxy alkylenoxy or alkenoxy groups.

The compounds of the invention may be prepared by the interaction of dichloroacetyl chloride and a substituted aniline of the general formula:

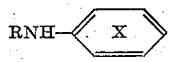
II wherein R and X have the above defined meanings in the presence of an acid binding agent. The reaction may be conducted between approximately equimolecular quantities of reactants in aqueous suspension or in a mixture of water and an organic solvent, for example benzene, in which the reactants are soluble, in both of which cases the acid-binding agent is preferably sodium acetate. The reaction may also be conducted in an organic solvent, for example benzene, in which the reactants are soluble, in which case it is convenient to employ a molar excess of the substituted aniline as acid-binding agent.

Compounds having the general Formula I wherein the phenyl radical is substituted by one or more alkoxy or aralkoxy groups may be derived from the corresponding hydroxy compounds by methods well known in the art.

The following non-limitative examples illustrate the invention.

Example 1

In the preparation of 4-hydroxy-N-methyl-dichloracetanilide a mixture of 34.5 grams of p-methylaminophenol sulphate, 68 grams of sodium acetate trihydrate, 2 grams of sodium bisulphite, 200 cc. of water and 300 cc. of benzene is stirred and cooled to approximately 6° C. To the cooled solution is added slowly over a period of 20 minutes a solution of 30 grams of dichloroacetyl chloride in 100 cc. of benzene, the temperature being maintained within the range of 6°-8° C. throughout. The reaction mixture is then allowed to return to room temperature and after the lapse of 1 hour the solid which has separated is isolated by filtration, washed with water and dried in vacuo before being recrystallised from aqueous alcohol and finally from ethyl acetate. There is thus obtained 4-hydroxy-N-methyl-dichloracetanilide in the form of a crystalline solid which has a melting point of 175° C. [Found: N, 6.2. $C_9H_9O_2NCl_2$ requires N, 6.0.]

In a similar manner, from the appropriately substituted aminophenol, the following compounds may be prepared.

Dichloroacet-2-hydroxy-N-methylanilide, M.P. 147–148° C. (Found: N, 6.1. $C_9H_9O_2NCl_2$ requires N, 6.0%.)

Dichloroacet-2-hydroxy-N-ethylanilide, M.P. 112° C. (Found: N, 5.9. $C_{10}H_{11}O_2NCl_2$ requires N, 5.6%.)

Dichloroacet-3-hydroxy-N-methylanilide, M.P. 179° C. (Found: C, 46.2; H, 3.8. $C_9H_9O_2NCl_2$ requires C, 46.2; H, 3.9%.)

Dichloroacet-N-ethyl-4-hydroxyanilide, M.P. 125° C. (Found: C, 48.9; H, 4.5. $C_{10}H_{11}O_2NCl_2$ requires C, 48.4; H, 4.5%.)

Example 2

In the preparation of 4-hydroxy-N-benzyl-dichloroacetanilide a solution of 7.4 grams of dichloroacetyl chloride in 25 cc. of benzene is added slowly over a period of 30 minutes to a stirred solution of 19.9 grams of p-benzylaminophenol in 200 cc. of benzene, the temperature of the mixture remaining at approximately 30° C. during this operation. When the addition is complete the precipitate of p-benzylaminophenol hydrochloride is isolated by filtration. The filtrate is washed successively with dilute hydrochloric acid, dilute aqueous sodium carbonate solution and with water before being dried over anhydrous magnesium carbonate and concentrated by distillation to a volume of approximately 30 cc. The residual solution is allowed to stand at room temperature and the solid which separates is isolated by filtration and dried in vacuo at 100° C. There is thus obtained 4-hydroxy-N-benzyldichloracetanilide in the form of a crystalline solid which has a melting point of 149° C. [Found: C, 58.5; H, 4.2. $C_{15}H_{13}O_2NCl_2$ requires C, 58.1; H, 4.2.]

Example 3

In the preparation of dichloroacet-3:4-dihydroxy-N-methyl-anilide, 4.7 grams of dichloroacetyl chloride in 5 cc. of methyl propyl ketone is slowly added over a period of 10 minutes to a stirred mixture of 7 grams of 3:4-dihydroxy-N-methylaniline hydrobromide, 7.28 grams of sodium acetate, 8 cc. of water and 40 cc. of methyl propyl ketone, the temperature being maintained at 10° C. The reaction is carried out in an atmosphere of nitrogen. After addition is complete, the reaction mixture is stirred for a further 15 minutes and is allowed to stand at room temperature for 2 hours before the organic layer is separated and washed with 20 cc. of N hydrochloric acid and 20 cc. of N sodium carbonate solution. After drying the washed methyl propyl ketone solution over anhydrous sodium sulphate, the solvent is removed by distillation under reduced pressure in an atmosphere of nitrogen. The dark glass-like residue crystallises slowly on standing. The resulting crystals are dissolved in 50 cc. of ether, the solution so obtained is filtered, and the ether is removed by distillation in an atmosphere of nitrogen. The light brown residue crystallises slowly on standing. There is thus obtained 3:4-dihydroxy-N-methylanilide in the form of a crystalline solid which has a melting point of 122–124° C. (Found: C, 44.5; H, 3.75. $C_9H_9O_3NCl_2$ requires C, 43.2; H, 3.6%.)

3:4-dihydroxy-N-methylaniline hydrobromide employed in the above reaction is prepared as follows. 8.4 grams of 3:4-dimethoxy-N-methylaniline hydrochloride is heated under reflux with 80 cc. of 48% aqueous hydrogen bromide for 4 hours. The reaction mixture is cooled and allowed to stand at 0° C. for several days. The resulting buff-coloured crystalline solid is isolated by filtration and washed with acetone and is used in the above reaction without further purification. It has a melting point of 199–200° C.

Example 4

In the preparation of dichloroacet-3:5-dihydroxy-N-methyl-anilide, a mixture of 30 grams of phloroglucinol, 30 cc. of 25% w./v. aqueous methylamine and 30 cc. of water is shaken in a stoppered flask and allowed to stand overnight with the exclusion of air. The aqueous layer is removed by decanting and the oily residue is dissolved in 50 cc. of methyl propyl ketone and the resulting solution is mixed with 60 cc. of 28.5% aqueous sodium acetate. This mixture is stirred at 8–10° C. while 22.2 grams of dichloroacetyl chloride in 25 cc. of methyl propyl ketone is slowly added over a period of 30 minutes. After stirring for a further 30 minutes, the aqueous layer is separated and discarded, and the methyl propyl ketone layer, after washing with 25 cc. of N hydrochloric acid, 25 cc. of aqueous sodium acetate and 25 cc. of water, is evaporated to dryness under reduced pressure. The orange solid residue is recrystallised from alcohol and from acetone. There is thus obtained dichloroacet-3:5-dihydroxy-N-methylanilide in the form of a crystalline solid which has a melting point of 220° C. with decomposition. (Found: C, 43.1; H, 3.1. $C_9H_9O_3NCl_2$ requires C, 43.2; H, 3.6%.)

Example 5

In the preparation of dichloroacet-4-hydroxy-N-propylanilide, 8.0 grams of dichloroacetyl chloride in 20 cc. of benzene is slowly added to a stirred mixture of 4.6 grams of 4-hydroxy-N-propylaniline, 5.3 grams of 4-hydroxy-N-propylanilinium bromide, 11 grams of sodium acetate, 40 cc. of water and 40 cc. of benzene, the temperature being maintained at 5–10° C. The reaction mixture is stirred for a further 45 minutes at 10–15° C. before the precipitated solid is removed by filtration and recrystallised from aqueous alcohol. There is thus obtained dichloroacet-4-hydroxy-N-propylanilide in the form of a crystalline solid, which has a melting point of 135–136° C. (Found: C, 50.95; H, 5.15. $C_{11}H_{13}O_2NCl_2$ requires C, 50.4; N, 5.0%.)

Example 6

In the preparation of dichloroacet-3:5-dihydroxy-N-ethylanilide, 13.75 grams of dichloroacetyl chloride in 20 cc. of methyl propyl ketone is slowly added with stirring to a mixture of 13.75 grams of 3:5-dihydroxy-N-ethylaniline, 10.5 grams of sodium acetate, 35 cc. of water and 110 cc. of methyl propyl ketone. The mixture is stirred for a further 30 minutes before the organic layer is separated, washed with a 25 cc. of N-hydrochloric acid, 25 cc. of N sodium carbonate solution and 25 cc. of water. The solvent is removed by distillation under reduced pressure and the residue is recrystallised from acetone. There is thus obtained dichloroacet-3:5-dihydroxy-N-ethylanilide in the form of a crystalline solid which has a melting point of 190° C. (Found: C, 45.7; H, 4.0, $C_{10}H_{11}O_3NCl_2$ requires C, 45.45; H, 4.2%.)

3:5-dihydroxy-N-ethylaniline employed in the above reaction is prepared as follows. A mixture of 20 grams of phloroglucinol, 8.8 cc. of 63.5% w./v. aqueous ethylamide and 80 cc. of water is allowed to stand for two days. At the end of this time, the precipitated solid is removed by filtration, washed with water, and recrystallised from alcohol. There is thus obtained 3:5-dihydroxy-N-ethylaniline in the form of a crystalline solid which has a melting point of 182° C. (Found: N, 9.1%. $C_8H_{11}O_2N$ requires N, 9.15%.)

Example 7

In the preparation of 4-butoxy-N-methyl-N-dichloracetanilide a solution of 7.4 grams of dichloracetylchloride in 20 cc. of benzene is added slowly over a period of 20 minutes to a stirred mixture, maintained at approximately 5° C., of 8.95 grams of 4-butoxy-N-methyl aniline, 10 grams of sodium acetate trihydrate, 30 cc. of benzene and 20 cc. of water. The reaction mixture is allowed to return to room temperature and after the lapse of one hour the benzene layer is isolated, washed successively with dilute hydrochloric acid, dilute sodium carbonate solution and with water, before being dried and evaporated to dryness. The residual oil is fractionally distilled under reduced pressure and that fraction is collected which has a boiling point of 146.5–147° C. at a pressure of 0.15 millimetre of mercury. There is thus obtained 4-butoxy-N-methyl-N-dichloracetanilide in the form of an oil, $n_D^{20}$ 1.5385. [Found: C, 54.2; H, 5.9. $C_{13}H_{17}O_2NCl_2$ requires C, 53.8; H, 5.9.]

In a similar manner using the appropriately substituted aniline there are prepared the following compounds:

4-methoxy-N-methyl-N-dichloracetanilide. M.P. 76° C. [Found: C, 48.4; H, 4.45. $C_{10}H_{11}O_2NCl_2$ requires C, 48.4; H, 4.47.]

Dichloroacet-N-ethyl-4-methoxyanilide. B.P. 142–148° C./6–9×10⁻³ mm. (Found: C, 51.0; H, 5.1. $C_{11}H_{13}O_2NCl_2$ requires C, 50.4; H, 5.0%.)

Dichloroacet-4-ethoxy-N-methylanilide. B.P. 130° C./0.1 mm. (Found: C, 51.1; H, 5.1. $C_{11}H_{13}O_2NCl_2$ requires C, 50.4; H, 5.0%.)

Dichloroacet-3-methoxy-N-methylanilide. M.P. 125° C. (Found: C, 48.4; H, 4.8. $C_{10}H_{11}O_2NCl_2$ requires C, 48.4; H, 4.5%.)

Dichloroaceto-4-methoxy-N-propylanilide. B.P. 130°/0.01 mm. (Found: C, 52.9; H, 5.5. $C_{12}H_{15}O_2NCl_2$ requires C, 52.2; H, 5.5%.)

Dichloroacet-N-methyl-4-n-propoxyanilide. B.P. 130° C./0.03 mm. (Found: C, 52.8; H, 5.5. $C_{12}H_{15}O_2NCl_2$ requires C, 52.2; H, 5.5%.)

Dichloroacet-N-methyl-4-isopropoxyanilide. B.P. 140° C./0.02 mm. (Found: C, 52.0; H, 5.5. $C_{12}H_{15}O_2NCl_2$ requires C, 52.2; H, 5.5%.)

4-allyloxy-N-dichloroacet-N-methylanilide. B.P. 130° C./0.01 mm. (Found: C, 52.3; H, 4.7. $C_{12}H_{13}O_2NCl_2$ requires C, 52.6; H, 4.8%.)

Dichloroacet-N-methyl-4-phenoxyanilide. M.P. 57–58° C. (Found: C, 58.1; H, 4.1. $C_{15}H_{13}O_2NCl_2$ requires C, 58.1; H, 4.2%.)

Dichloroacet-2-methoxy-N-methylanilide. M.P. 74° C. (Found: C, 48.8; H, 4.5. $C_{10}H_{11}O_2NCl_2$ requires C, 48.4; H, 4.4%.)

Dichloroacet-3:4-dimethoxy-N-methylanilide. M.P. 94° C. (Found: C, 47.2; H, 4.8. $C_{11}H_{13}O_3NCl_2$ requires C, 47.5; H, 4.7%.)

Dichloroacet-2-n-butoxy-N-methylanilide. B.P. 122–124° C./0.04 mm. (Found: C, 53.75; H, 5.8. $C_{13}H_{17}O_2NCl_2$ requires C, 53.8; H, 5.9%.)

N-methyl-m-anisidine which is employed in the preparation of the above-mentioned dichloroacet-3-methoxy-N-methylanilide is prepared as follows. A mixture of 20 grams of form-m-anisidine, 30 grams of potassium hydroxide and 100 cc. of acetone is heated under reflux with stirring for 15 minutes and at the end of this time, 38 grams of methyl iodide in 30 cc. of acetone is slowly added to the boiling reaction mixture. After heating under reflux for a further 10 minutes, the mixture is allowed to cool, the potassium iodide which is precipitated is removed by filtration and the solvent is removed from the filtrate by distillation. The residual gum is hydrolysed by heating under reflux with 50 cc. of 6 N hydrochloric acid for 2 hours, and the resulting solution is evaporated under reduced pressure. The residue is dried by evaporating twice with 15 cc. of absolute alcohol. The crude hydrochloride so obtained is converted to the free base by treatment with sodium hydroxide solution and the oil so obtained is separated and distilled under reduced pressure. There is thus obtained N-methyl-m-anisidine in the form of an oil, which has a boiling point of 86–90° C. under a pressure of 1.5–2.5 mm. of mercury. (Found: N, 10.0. $C_8H_{11}ON$ requires N, 10.2%.)

In a similar manner, using the formyl derivative of the appropriate amine and the appropriate alkylating agent there are obtained the following compounds which are intermediates for the preparation of some of the above-mentioned dichloroacetanilides. The compounds are described below in the form of their hydrochlorides and may be converted to the free amines by conventional methods before being used to prepare the corresponding dichloroacetanilides by the method described above. Alternatively the amine hydrochloride may itself be employed in the formation of the dichloroacetanilide according to the method described above in which case 2 molecular proportions of sodium acetate are employed in the reaction mixture.

4-methoxy-N-propylaniline hydrochloride, M.P. 125° C. (Found: N, 7.2. $C_{10}H_{16}ONCl$ requires N, 6.9%.)
N-methyl-4-n-propoxyaniline hydrochloride, M.P. 109° C. (Found: N, 7.2. $C_{10}H_{16}ONCl$ requires N, 6.95%.)
4-allyloxy-N-methyl aniline hydrochloride, M.P. 92° C. (Found: N, 7.2. $C_{10}H_{14}ONCl$ requires N, 7.0%.)
N-methyl-4-phenoxyaniline hydrochloride M.P. 149-150° C. (Found: N, 6.15. $C_{13}H_{14}ONCl$ requires N, 5.95%.)
N-methyl-o-methoxyaniline hydrochloride, M.P. 118-120° C. (Found: N, 8.05. $C_8H_{12}ONCl$ requires N, 8.1%.)
2-butoxy-N-methylaniline hydrochloride, M.P. 124-126° C. (Found: C, 61.25; H, 8.4. $C_{11}H_{18}ONCl$ requires C, 61.3. H, 8.35%.)

Example 8

In the preparation of 4-methoxy-N-methyl-N-dichloracetanilide a mixture of 11.7 grams of 4-hydroxy-N-methyl-N-dichloracetanilide, 7 grams of anhydrous potassium carbonate, 10 grams of methyl iodide and 100 cc. of acetone is stirred vigorously and heated under reflux for 3 hours when a further 4.5 grams of methyl iodide is added. The reaction mixture is heated under reflux for a further 1.5 hours before being subjected to distillation to reduce the volume to approximately 40 cc. The cooled residue is poured into a mixture of 150 cc. of ice water and 10 cc. of 5 N sodium hydroxide. The solid which separates is isolated by filtration and is recrystallised from a mixture of benzene and petroleum ether. There is thus obtained 4-methoxy-N-methyl-N-dichloracetanilide in the form of a crystalline solid which has a melting point of 74° C. and is identical with the compound described in the latter part of Example 7.

In a similar manner, using dichloracet-3-hydroxy-N-methylanilide in place of dichloroacet-4-hydroxy-N-methylanilide, there may be prepared 3-butoxy-N-dichloroacet-N-methylanilide, M.P. 47-48° C. (Found: C, 54.4; H, 5.7. $C_{13}H_{17}O_2NCl_2$ requires C, 53.8; H, 5.9%.)

In a similar manner, using dichloroacet-4-hydroxy-N-methylanilide and benzyl chloride, there may be prepared 4-benzyloxy-N-dichloroacet-N-methylanilide, M.P. 76° C. (Found: C, 59.0; H, 4.7. $C_{16}H_{15}O_2NCl_2$ requires C, 59.3; H, 4.7%.)

Example 9

In the preparation of 4-butoxy-N-methyl-N-dichloracetanilide a mixture of 35.1 grams of 4-hydroxy-N-methyl-N-dichloracetanilide, 24 grams of anhydrous potassuim carbonate, 200 cc. of acetone and 30 grams of butyl iodide is heated under reflux with stirring for 5.5 hours. The reaction mixture is concentrated by distillation to approximately 100 cc. and is poured into a mixture of 400 cc. of ice water and 30 cc. of 5 N sodium hydroxide. The oil which separates is extracted in two portions each of 100 cc. of benzene and the combined benzene extracts are washed with water, dried over anhydrous sodium sulphate and evaporated. The residue is subjected to distillation under reduced pressure and that fraction is collected which has a boiling point of 140° C. (bath temperature) at a pressure of 0.01 millimetres of mercury. There is thus obtained 4-butoxy-N-methyl-N-dichloracetanilide in the form of an oil, $n_D^{20}$ 1.5384, which is identical with the product described in the first half of Example 7.

Example 10

In the preparation of dichloroacet-3-hydroxy-4-methoxy-N-methylanilide, a mixture of 5 grams of 4-methylaminoveratrole 25 cc. of glacial acetic acid and 15 cc. of 48% aqueous hydrogen bromide, is heated under reflux for 2 hours in an atmosphere of nitrogen. The solvent is removed by distillation under reduced pressure in an atmosphere of nitrogen to leave a yellow gummy residue. The latter is dissolved in 20 cc. of water and stirred with 8.4 grams of sodium acetate and 20 cc. of benzene whilst an atmosphere of nitrogen is maintained. To the suspension so obtained is added with cooling and stirring 3.6 grams of dichloroacetyl chloride in 10 cc. of benzene and the reaction mixture is left to stand overnight. The solid which separates is isolated by filtration and recrystallised from aqueous alcohol. There is thus obtained dichloroacet-3-hydroxy-4-methoxy-N-methylanilide in the form of a crystalline solid, which has a melting point of 162.5-163.5° C. (Found: C, 45.3; H, 4.2. $C_{10}H_{11}O_3Cl_2$ requires C, 45.5; H, 4.2%.)

Example 11

In the preparation of 4-(dichloro-N-methylacetamido)-phenoxyacetic acid, a mixture of 11.7 grams of dichloro-4-hydroxy-N-methylanilide, 8.35 grams of ethyl bromoacetate, 6.9 grams of potassium carbonate and 250 cc. of acetone is heated under reflux with stirring overnight. At the end of this time the reaction mixture is allowed to cool, the insoluble material so obtained is removed by filtration and the acetone is removed by distillation. The residual brown oil is warmed with 50 cc. of 2 N sodium hydroxide solution for 30 minutes to give a clear solution. This solution is acidified with 2 N sulphuric acid and cooled in ice, resulting in a buff-coloured precipitate, which is recrystallised twice from aqueous alcohol and dried in air. There is thus obtained 4-(dichloro-N-methylacetamido) phenoxyacetic acid in the form of a colourless crystalline solid which has a melting point of 104-105.5° C. [Found: C, 43.0; H, 4.4; $H_2O$, 5.77. $C_{11}H_{11}O_4NCl_2 \cdot H_2O$ requires C, 42.6; H, 4.2; $H_2O$, 5.8%.]

Example 12

In the preparation of N-methyl-3:4-methylenedioxydichloroacetanilide 20 grams of 4-nitromethylenedioxybenzene is hydrogenated at 20° C. and atmospheric pressure in methanol over 0.5 gram of palladised charcoal. Reduction is complete after 4½ hours and the reaction mixture is filtered and the solvent removed from the filtrate by distillation in vacuo. The crude 4-aminomethylenedioxybenzene so obtained is formylated by heating under reflux for 1 hour with 50 cc. of formic acid. At the end of this time, excess formic acid is removed by distillation in vacuo and the residue is crystallised from 50 cc. of a mixture of equal volumes of alcohol and water. The 3:4-methylenedioxyformanilide so obtained has a melting point of 95-96° C. This material is dissolved in 100 cc. of acetone and the solution so obtained is added to a stirred suspension of 28 grams of powdered potassium hydroxide in 200 cc. of acetone. After 5 minutes, 28.4 grams of methyl iodide is added and after the exothermic reaction is complete, the suspension is stirred and heated under reflux for 15 minutes. The clear solution is decanted from the sticky precipitate of inorganic salts and evaporated to dryness in vacuo. The crude N-methyl-3:4-methylenedioxyformanilide so obtained is heated on the steam bath for 30 minutes with 100 cc. of 2 N hydrochloric acid to give a solution of N-methyl-3:4-methylenedioxyaniline hydrochloride. The solution is cooled to room temperature and 100 grams of crystalline sodium acetate and 100 cc. of water are added. To this solution a solution of 30 grams of dichloroacetyl chloride in 100 cc. of petroleum ether (boiling range 60–80° C.) is added with vigorous stirring. The product separates out as a gum which rapidly solidifies and is removed by filtration, washed with water and crystallised from a mixture of 50 cc. of methanol and 20 cc. of water. There is thus obtained N-methyl-3:4-methylenedioxydichloroacetanilide in the form of a colourless crystalline solid which has a melting point of 98° C. [Found: C, 45.7; H, 3.6. $C_{10}H_9O_3NCl_2$ requires C, 45.8; H, 3.4%.]

What we claim is:

1. A dichloroacetanilide of the formula

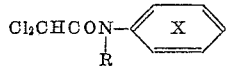

in which R represents a lower alkyl radical and in which the phenyl radical X is substituted by one to two members selected from the group consisting of hydroxy, lower alkoxy, lower alkenyloxy and lower alkylenedioxy groups.

2. 4-hydroxy-N-methyl-dichloracetanilide.
3. Dichloroacet-3:5-dihydroxy-N-methylanilide.
4. 4-butoxy-N-methyl-N-dichloroacetanilide.
5. 4-allyloxy-N-dichloroacet-N-methylanilide.
6. 4-methoxy-N-methyl-N-dichloroacetanilide.
7. A dichloroacetanilide of the formula

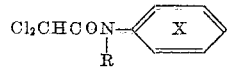

in which R represents a lower alkyl radical and in which the phenyl radical X is substituted by one to two lower alkylenedioxy groups.

8. N-methyl-3:4-methylenedioxydichloroacetanilide.

References Cited in the file of this patent

FOREIGN PATENTS 521,876  Belgium _____ Aug. 31, 1953

OTHER REFERENCES

Ozawa et al.: Chem. Absts., vol. 47 (1953), col. 10806b (original article in J. Phar. Soc. Japan, vol. 73, pp. 719–21 (1953)).

Clark et al.: Biochem. J., vol. 55, December 1953, pp. 839 and 847.

McKie: J. Chem. Soc. (London), vol. 123 (1932), pp. 2213 to 2217.